(12) United States Patent
Chen (10) Patent No.: US 10,675,506 B2
(45) Date of Patent: Jun. 9, 2020

(54) EMBEDDED MAGNETIC INDUCTION PEDAL DEVICE

(71) Applicant: BION INC., New Taipei (TW)

(72) Inventor: Yi-Lun Chen, Taipei (TW)

(73) Assignee: Bion Inc., New Taipei (TW)

( * ) Notice: Subject to any disclaimer, the term of this patent is extended or adjusted under 35 U.S.C. 154(b) by 165 days.

(21) Appl. No.: 15/856,331

(22) Filed: Dec. 28, 2017

(65) Prior Publication Data

US 2019/0060709 A1   Feb. 28, 2019

(30) Foreign Application Priority Data

Aug. 28, 2017 (TW) .............................. 106129120 A (51) Int. Cl.
| | |
|---|---|
| A63B 24/00 | (2006.01) |
| A63B 69/16 | (2006.01) |
| B62J 99/00 | (2020.01) |
| B62M 3/08 | (2006.01) |
| B62M 3/16 | (2006.01) |
| G01D 5/20 | (2006.01) |

(52) U.S. Cl.
CPC .......... *A63B 24/0062* (2013.01); *A63B 69/16* (2013.01); *B62J 99/00* (2013.01); *B62M 3/08* (2013.01); *B62M 3/16* (2013.01); *G01D 5/20* (2013.01); *A63B 2207/02* (2013.01); *A63B 2209/08* (2013.01); *A63B 2220/17* (2013.01); *A63B 2220/30* (2013.01); *A63B 2225/50* (2013.01); *B62J 2099/002* (2013.01); *B62J 2099/004* (2013.01); *B62J 2099/008* (2013.01); *B62J 2099/0013* (2013.01)

(58) Field of Classification Search
CPC ...... A63B 24/0062; A63B 69/16; B62M 3/08; B62M 3/14; B62J 2099/0013; B62J 2099/002; B62J 2099/004
See application file for complete search history.

(56) References Cited

U.S. PATENT DOCUMENTS

| | | | |
|---|---|---|---|
| 2002/0134192 A1* | 9/2002 | Chang | B62M 3/12 74/594.4 |
| 2015/0023033 A1* | 1/2015 | Kuo | B62J 6/00 362/473 |
| 2016/0052584 A1* | 2/2016 | Sasaki | B62J 99/00 74/594.4 |

(Continued)

*Primary Examiner* — Tony H Winner
(74) *Attorney, Agent, or Firm* — Rosenberg, Klein & Lee (57) ABSTRACT

An embedded magnetic induction pedal device adapted to be mountable to a bicycle pedal crank, which includes a pedal body, a bearing, a pedal axle, a magnetic induction unit, a permanent magnet unit, a processing unit, a transmission device, and a power supply unit. The pedal body is formed with an axle hole in which the magnetic induction unit is arranged. The pedal axle is received in the axle hole. The eccentric seat is mounted to the pedal axle. The permanent magnet unit is retained in the eccentric seat and is set at a position that is deviated from an axis of the pedal axle so that during a relative motion between the permanent magnet unit and the magnetic induction unit, the magnetic induction unit detects a variation of the magnetic field, based on which the processing unit calculate and determine operation data of the pedal crank that are transmitted by the transmission device.

15 Claims, 9 Drawing Sheets

(56) References Cited

U.S. PATENT DOCUMENTS

2016/0375953 A1* 12/2016 Chen .................. B62M 3/08
                                                    74/594.4
2018/0087983 A1*  3/2018 Chen ............. A63B 22/0046
2018/0202876 A1*  7/2018 Binder ............... G01L 3/102
2018/0229799 A1*  8/2018 Lo ..................... B62M 6/50

* cited by examiner

EMBEDDED MAGNETIC INDUCTION PEDAL DEVICE

BACKGROUND OF THE INVENTION

1. Field of the Invention

The present invention relates to a bicycle pedal device, and in particular to a bicycle pedal device that detects rotation data of a pedal crank through an induction magnetic field.

2. The Related Arts

Internet of Things (IoT) is an information carrier, similar to the Internet and telecommunication networks, which is a network that allows for interconnection among regular physical objects capable of independent functionality. IoT realizes digitalization of the real world and allows for extremely wide applications.

Among assistive devices of bicycles, a variety of concepts for application of IoT have been proposed. For example, an arrangement of integrating with global positioning system (GPS) and a variety of sensors may be provided for transmission of messages to a handheld device or a remote device to allow a user to realize or track the path, as well as road condition and temperature thereof, along which a bicycle is moving, and physiological conditions of a cyclist of the bicycle.

The present invention is proposed, based on the idea of smart exercise devices, to provide a solution of integration of IoT with a bicycle pedal device in order to provide a novel devices, which is believed different from traditional ones, in the field of bicycle exercise.

SUMMARY OF THE INVENTION

For the above purpose, an objective of the present invention is to provide a bicycle pedal device that has a simplified structure and allows for measuring data concerning rotation of a pedal crank so as to allow a user to get better aware of instantaneous information of exercise and also provides advantages in respect of fabrication, assembly, and maintenance.

To achieve the above objective, the present invention provides an embedded magnetic induction pedal device, which is mountable to a pedal crank of a bicycle and comprises a pedal body, at least one bearing, a pedal axle, an eccentric seat, at least one permanent magnet unit, a processing unit, a transmission device, and a power supply unit. The pedal body is formed, in a central portion thereof, with an axle hole. The axle hole has an inside surface on which at least one magnetic induction unit is mounted. The axle hole is provided, on the inside surface thereof, with at least one bearing. The pedal axle is received in and coupled to the axle hole by means of the bearing. The eccentric seat is mounted to an end of the pedal axle. The permanent magnet unit is retained in the eccentric seat and the permanent magnet unit is set at a position that is deviated from an axis of the pedal axle so that during a relative motion between the permanent magnet unit and the magnetic induction unit, the magnetic induction unit may detect a variation of a magnetic field. The processing unit is connected to the magnetic induction unit to calculate, based on the variation of the magnetic field, and determine operation data of the pedal crank. The transmission device is connected to the processing unit to transmit the operation data of the pedal crank to the outside. The power supply unit supplies electrical power to the processing unit and the transmission device.

In summary, the embedded magnetic induction pedal device of the present invention provides at least the following advantages:

(1) The present invention may measure data concerning rotation of a pedal crank to allow a user to get better aware of instant information of exercise.

(2) The present invention has an advantage of easy installation by simply removing a pedal from a bicycle and replaced with the magnetic induction pedal according to the present invention for easy use.

(3) The present invention has a simple and reliable structure and is advantageous in fabrication and assembly and is easy to maintain.

BRIEF DESCRIPTION OF THE DRAWINGS

The present invention will be apparent to those skilled in the art by reading the following description of preferred embodiments of the present invention, with reference to the attached drawings, in which.

DETAILED DESCRIPTION OF THE PREFERRED EMBODIMENTS

Figure 3:
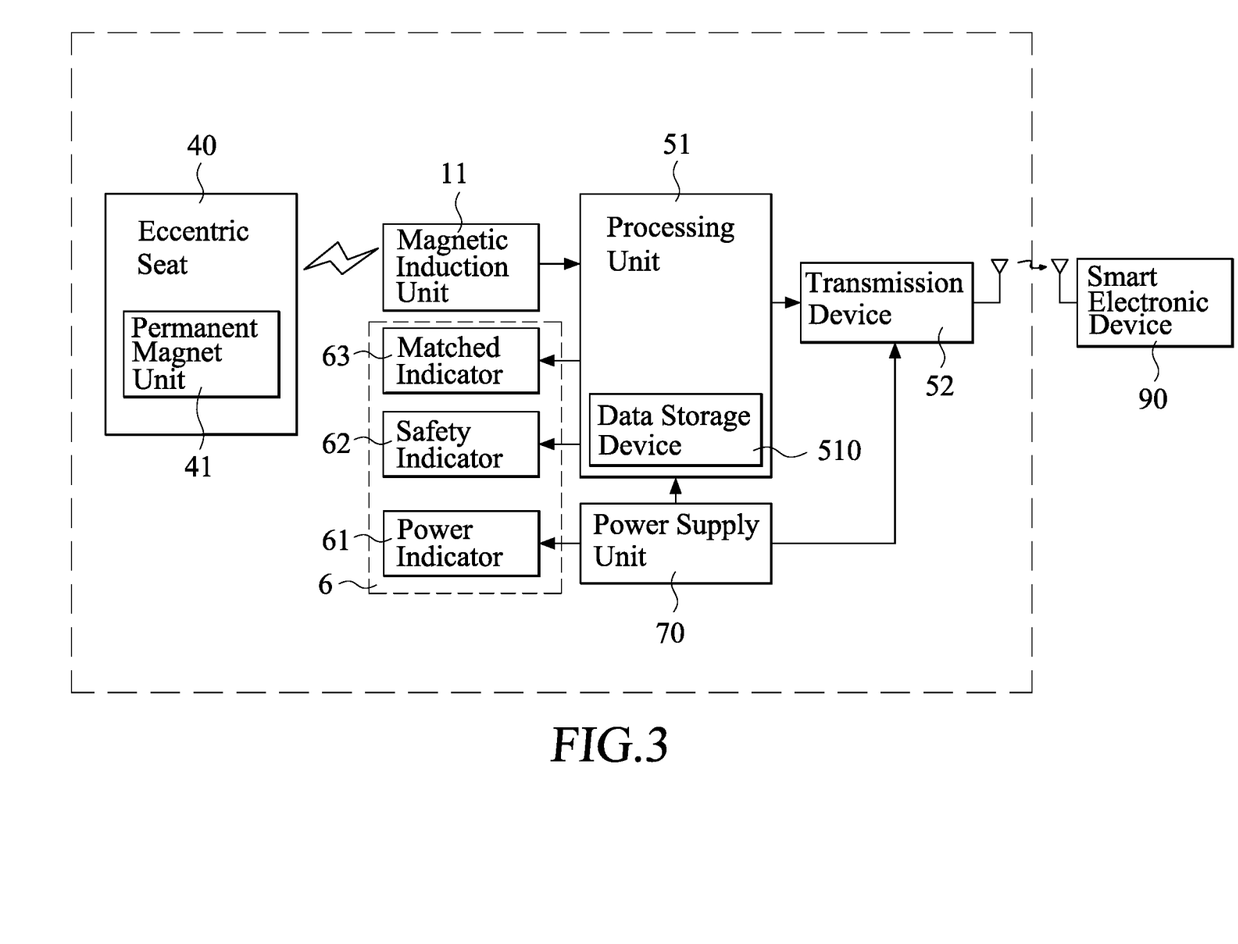
FIG. 3 is a system block diagram of the embedded magnetic induction device according to the present invention.

Referring to FIGS. 1-5, the present invention provides an embedded magnetic induction pedal device 1, which is installable on a pedal crank of a bicycle and comprises a pedal body 10, at least one bearing 20, a pedal axle 30, an eccentric seat 40, and at least one permanent magnet unit 41, and also comprises a processing unit 51, a transmission device 52, and a power supply unit 70 shown in FIG. 3.

Figure 1:
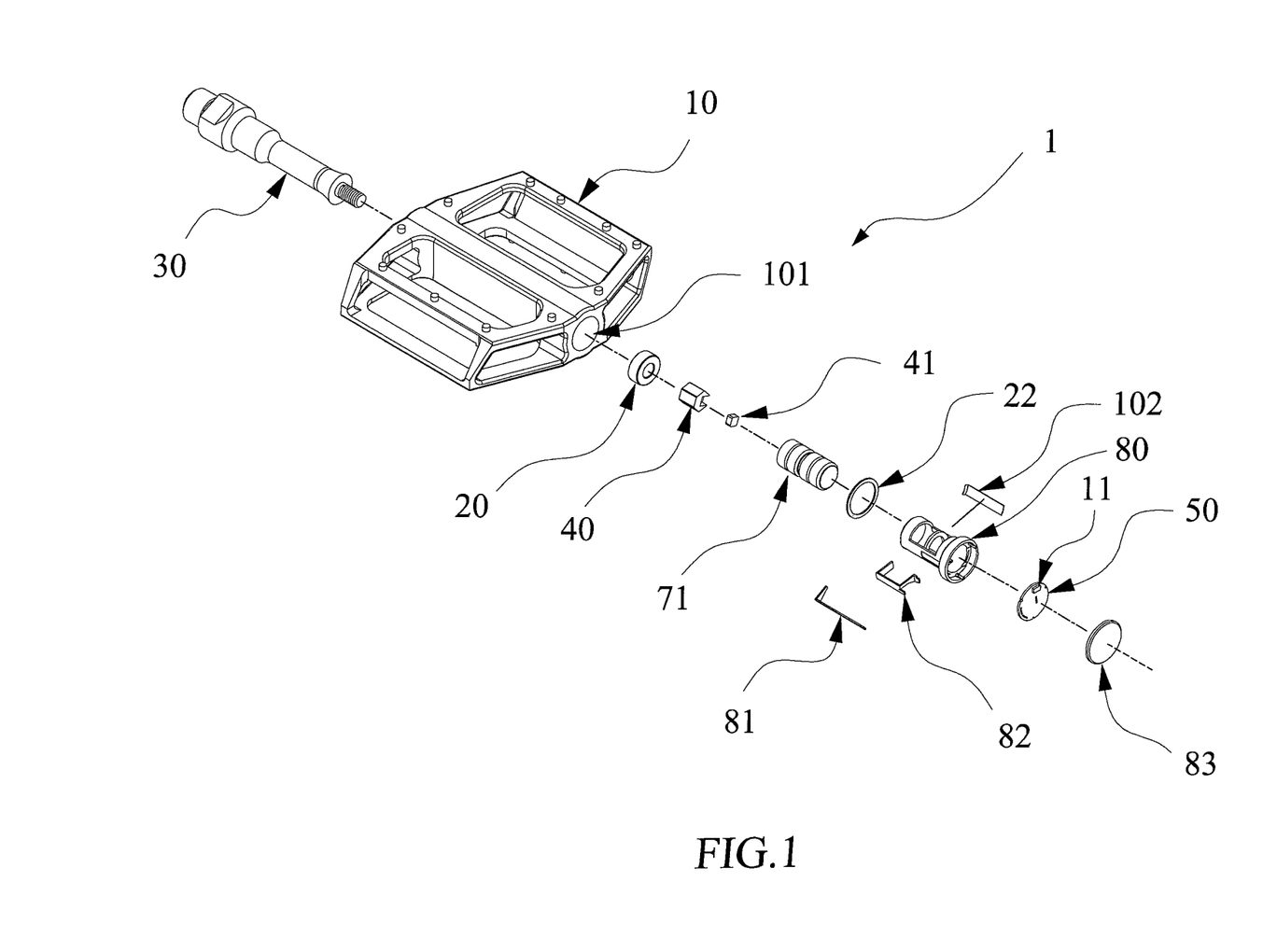
FIG. 1 is an exploded view showing an embedded magnetic induction pedal device according to a first embodiment of the present invention.
Figure 2:
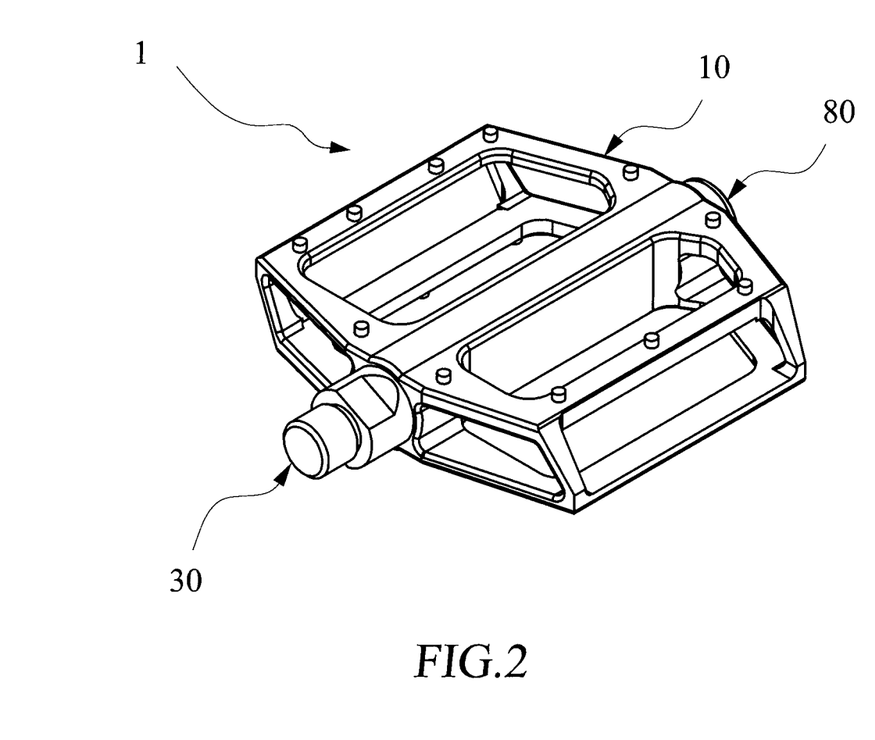
FIG. 2 is a perspective view showing the embedded magnetic induction device according to the present invention in an assembled form.

The pedal body 10 can be trod by a cyclist and may be made of a material comprising metal or engineering plastics. The pedal body 10 is provided with an axle hole 101 formed in a central portion thereof. The axle hole 101 is provided, on an inside surface thereof, with at least one magnetic induction unit 11. Specifically, the magnetic induction unit 11 may comprise an induction coil, a reed switch, or a Hall sensor element. The magnetic induction unit 11 is mounted on a circuit board 50.

The axle hole 101 is provided, on the inside surface thereof, with a bearing 20, and an end of the pedal axle 30 is received in and coupled to the axle hole 101 by means of the bearing 20. An opposite end of the pedal axle 30 is coupled to a pedal crank X of the bicycle (see FIG. 5), so that when the user is pedaling the bicycle, the pedal crank X is caused to rotate and a relative movement is generated between the pedal axle 30 and the pedal body 10.

The eccentric seat 40 is coupled to the free end of the pedal axle 30 and the permanent magnet unit 41 is mounted to the eccentric seat 40. For easy fabrication and accessibility, the eccentric seat 40 can be a nut having a portion being removed to form a hollowed section 42 (see FIG. 4) to receive and retain the permanent magnet unit 41 at the end of the pedal axle 30. Assembly can be achieved by simply positioning the permanent magnet unit 41 into the hollowed section 42, and then mounting the eccentric seat 40 to the end of the pedal axle 30.

Figure 4:
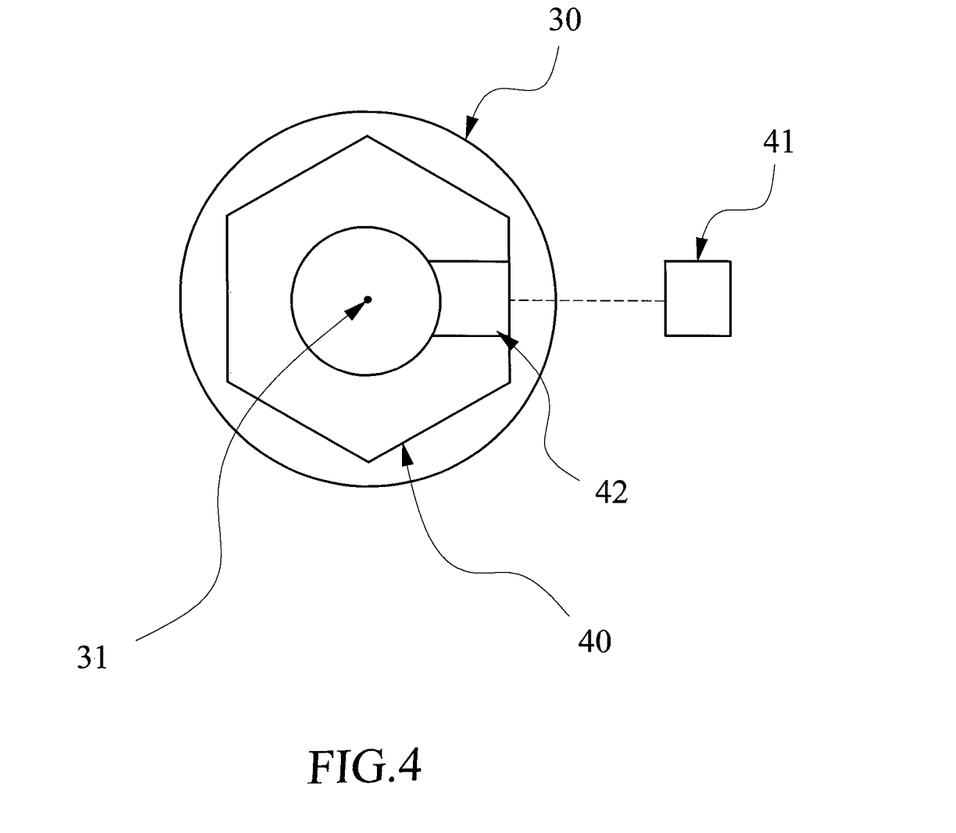
FIG. 4 is a schematic view illustrating spatial relationship among a pedal axle, an eccentric seat, and a permanent magnet unit of the embedded magnetic induction pedal device according to the present invention.

To allow the magnetic induction unit 11 to detect variation of a magnetic field during a relative motion generated between the permanent magnet unit 41 and the magnetic induction unit 11, the permanent magnet unit 41 is arranged such that when the eccentric seat 40 is mounted to the pedal axle 30, the permanent magnet unit 41 is set at a position that is deviated from an axis 31 of the pedal axle 30 so that the magnetism of the permanent magnet unit 41 can be detected by the magnetic induction unit 11. Referring to FIG. 4, which provides a schematic view observed from an end of the eccentric seat 40 mounted to the pedal axle 30, the hollowed section 42 of the eccentric seat 40 must be arranged such that the permanent magnet unit 41 is set a position that is deviated from the axis 31 of the pedal axle 30 as much as possible so as to allow the magnetic induction unit 11 to receive a maximum amount of variation of the magnetic field.

In another embodiment of the present invention, the eccentric seat 40 is made in the form of a cylinder that is formed with a hollowed section for receiving and holding the permanent magnet unit 41. An end of the eccentric seat 40 is formed with threading for threading engagement with mating threading formed on the free end of the pedal axle 30 so that the eccentric seat 40 and the pedal axle 30 are movable in unison with each other.

Figure 5:
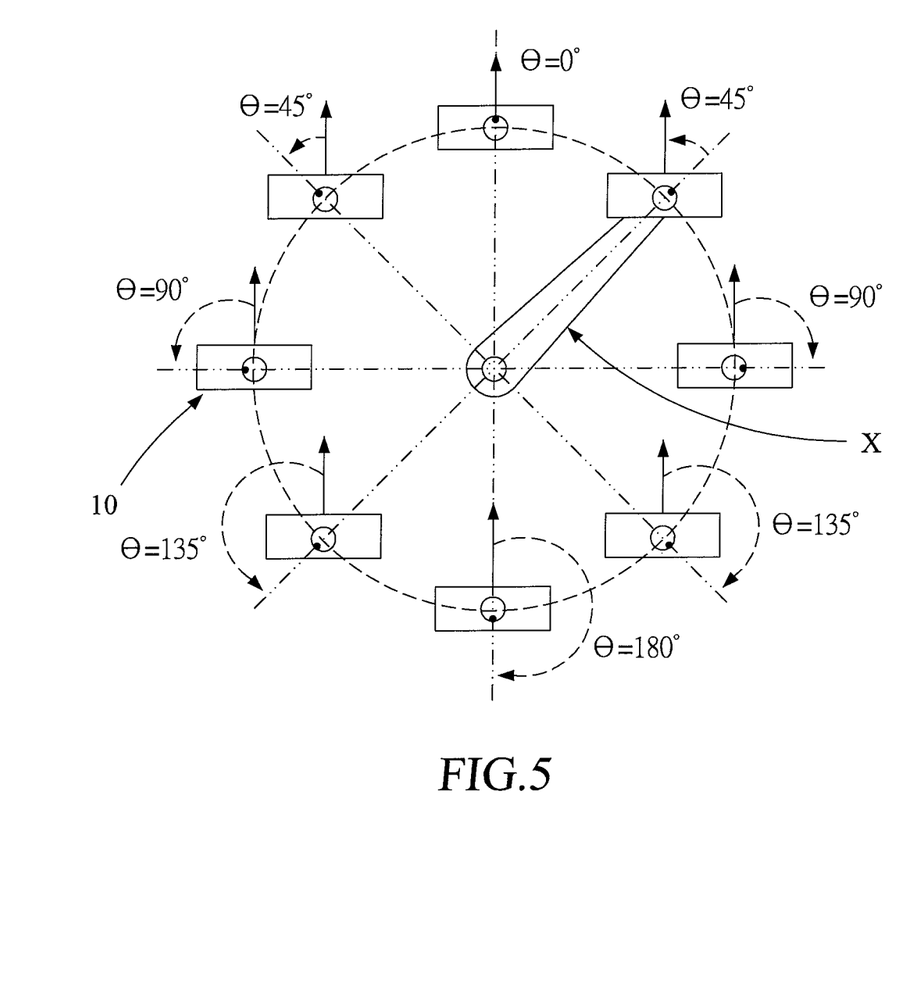
FIG. 5 is a schematic view illustrating a relative motion between the embedded magnetic induction device of the present invention and a pedal crank.
Figure 6:
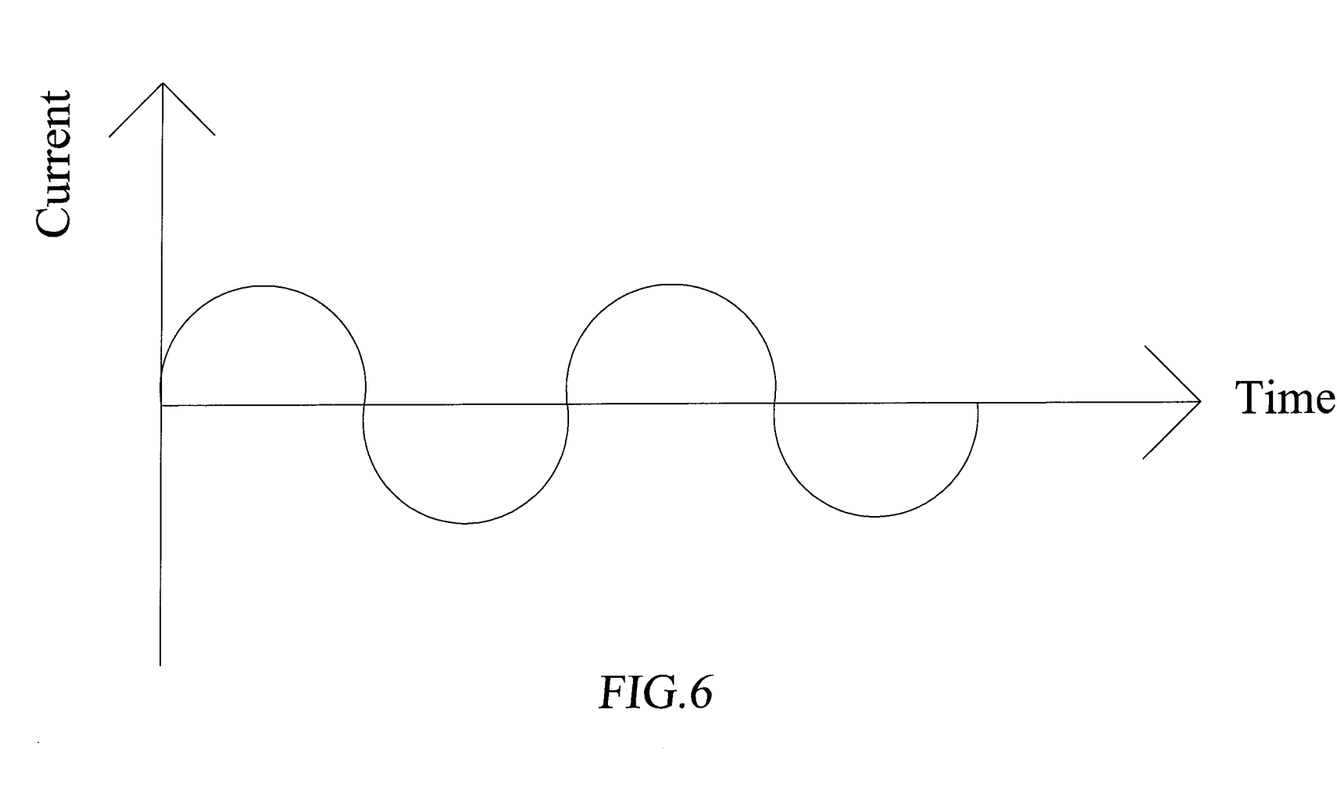
FIG. 6 shows a curve of an electrical current of the embedded magnetic induction pedal device according to the present invention.

Referring to FIG. 5, during the relative motion between the permanent magnet unit 41 and the magnetic induction unit 11, a relative angle between the pedal crank X and the pedal body 10 changes, and this leads to a variation of the magnetic field. An angle, θ, included between the pedal body 10 (reference being a top surface of the pedal) and the pedal crank X (reference being an axial direction thereof) changes constantly during a pedaling process (for example the angle of θ being consecutively at 0, 45, 90, 135, and 180 degrees), so that the magnetic induction unit 11 detects different magnitudes of the magnetic field. In case that the magnetic induction unit 11 comprises a Hall sensor element, a variation curve of an electrical current generated by the element is illustrated in FIG. 6. It is noted that the curve of electrical current shown in FIG. 6 is provided as an example of illustration and in an actual operation that the user pedals the bicycle, the curve so generated in not such an exact sine wave form. In case that the magnetic induction unit 11 comprises an induction coil, a similar waveform of electrical voltage or electrical current may be generated and provided for subsequent processing.

Figure 7:
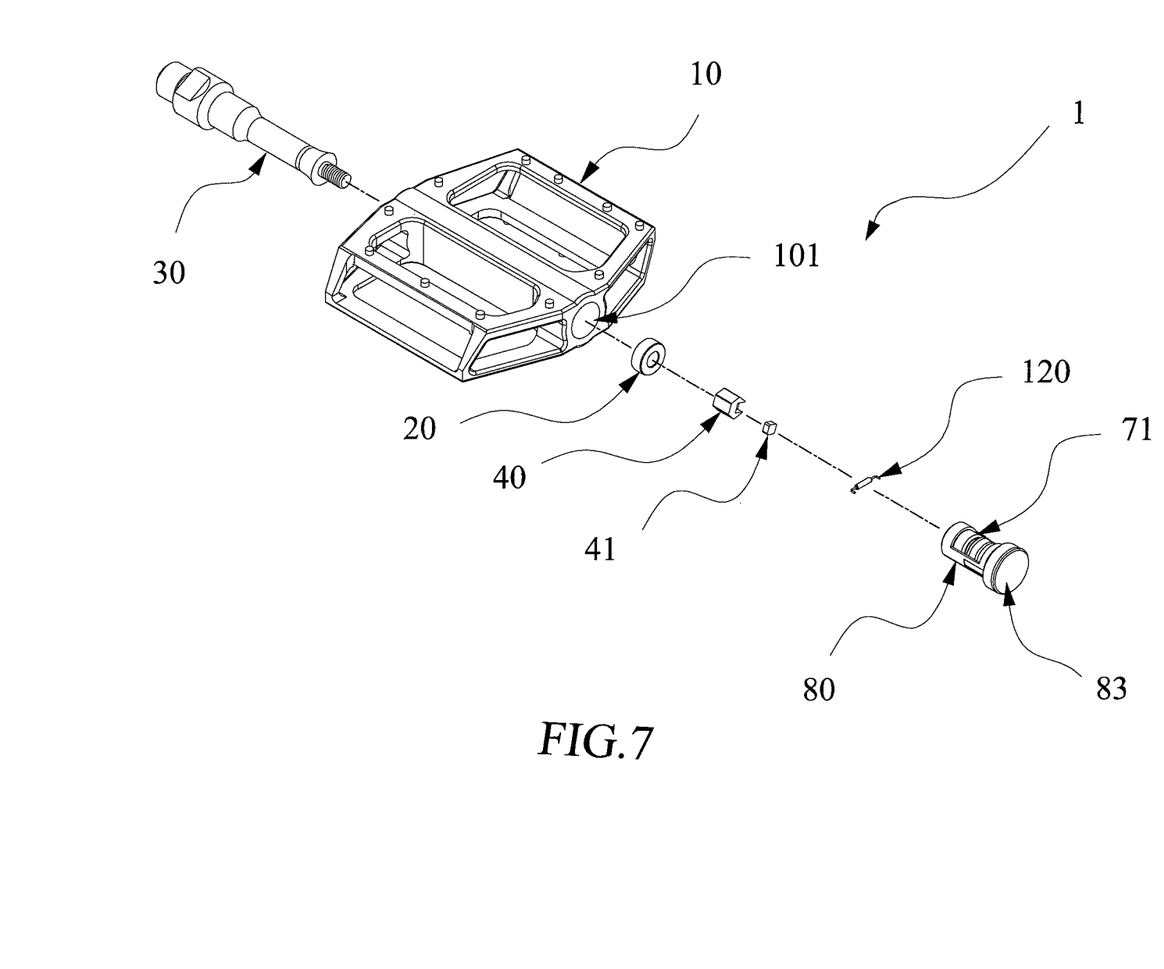
FIG. 7 is an exploded view showing an embedded magnetic induction pedal device according to a second embodiment of the present invention.

In case that the magnetic induction unit comprises a reed switch (as shown in FIG. 7), since the reed switch provides only two output levels of "ON" and "OFF", no waveform of electrical voltage or electrical current as that shown in FIG. 6 may be generated; however, operation data of the pedal crank may still be acquirable with the frequency of the reed switch.

Referring to FIG. 3, the processing unit 51 is connected to the magnetic induction unit 11 and may carry out a calculation, based on the variation of the magnetic field, to provide the operation data of the pedal crank. In reality, the processing unit 51 may specifically comprise a single-chip microcontroller in which programs are loaded to carry out the operation discussed above, and related control. Specifically, the processing unit 51 may carry out calculation, based on variation of electrical current or variation of electrical voltage induced in the magnetic induction unit 11 by the variation of the magnetic field, in order to generate the operation data of the pedal crank. The operation data of the pedal crank are provided to designate data regarding the movement of the pedal crank X resulting from the user pedaling the bicycle, such as the rotational speed of the pedal crank or accumulated turns of rotation of the pedal crank. The processing unit 51 may further comprise a data storage device 510 for storing the operation data of the pedal crank, identification (ID) data of the bicycle, bicycle condition, bicycle maintenance data, and/or physiological data of the user.

The transmission device 52 provides a function of being an interface of signal transmission. The transmission device 52 is connected to the processing unit 51 for transmission of the operation data of the pedal crank to the outside. The transmission device 52 can be any type of single chip or microcontroller capable of wireless transmission and wired transmission. Here, the term "outside" refers to an external terminal device, such as a smart electronic device 90, for example a cycling computer of the bicycle, a wrist watch, and a tablet computer, or a notebook computer or a desktop computer, in which associated programs are loaded, to display the operation data of the pedal crank so received for observation by the user or for use in other operations. The embedded magnetic induction pedal device 1, in a state of being in operation, could be in an operation mode of wireless transmission, and may be in an operation mode of wireless transmission or wired transmission for a state of being not in operation in order to download the operation data of the pedal crank to the bicycle cycling computer or a personal smart electronic device 90.

The power supply unit 70 is connected to the processing unit 51 and the transmission device 52 to supply electrical power required form the operations of the processing unit 51 and the transmission device 52. Specifically, the power supply unit comprises an electrical cell 71 and an associated power control circuit. The electrical cell can be a button cell, a permanent battery, a rechargeable battery, or other types of electrical cell.

The control circuit of the present invention may include at least one lighting indicator 6 for indicating operation status of the embedded magnetic induction pedal device of the present invention. For example, the lighting indicator 6 includes a power indicator 61 is electrically connected to the power supply unit 70 for indicating a power energy of the power supply unit 70 is in normal condition. A normal indicator 62 is connected to the processing unit 51 for indicating the operation of the embedded magnetic induction pedal device is in normal condition. Further, a matched indicator 63 is connected to the processing unit 51 for indicating that the processing unit 51 has successfully established a link pairing for wireless communication with the smart electronic device 90. Alternatively, the lighting indicator 6 may be a known multi-colored indicator capable of generating multiple colors indicating multiple operation status of the embedded magnetic induction pedal device 1 of the present invention.

Referring to FIGS. 1 and 7, for easy assembly and maintenance, the embedded magnetic induction pedal device 1 according to a second embodiment of the present invention comprises a fixing member 80, which is arranged inside the axle hole 101 of the pedal body 10 and is spaced from the free end of the pedal axle 30 by a predetermined distance. The fixing member 80 comprises a hollow cylindrical body, which is made of a material comprising plastics or other stiff materials. The fixing member 80 has a size matching the axle hole 101 in order to be easily disposed into the pedal body 10 and has an end that is a mechanism for locking to the pedal body 10. A hollow interior of the fixing member 80 receives the electrical cell 71 of the power supply unit 70 to dispose therein. The fixing member 80 also comprises an anode spring plate 81 and a cathode spring plate 82 for conduction of an electrical current from the electrical cell 71.

Further, the fixing member 80 may be provided, in one end thereof, with a space for receiving and holding therein the circuit board 50 and a covering lid 83. For easy assembly and maintenance, the transmission device 52 and the processing unit 51 may be provided on the circuit board 50. In this way, in case of failure or malfunctioning of the transmission device 52 and/or the processing unit 51, it only need to remove the covering lid 83 to allow the circuit board 50 to be taken out for repair, and thus, assembly is made extremely easy.

Also, the fixing member 80 of the pedal body 10 may be additionally provided, in a manner of being mounted thereto, with a magnetically permeable unit 102, which can be, specifically, a metal plate. The magnetically permeable unit 102 has a portion that is located adjacent to the permanent magnet unit 41 and another portion arranged adjacent to the magnetic induction unit 11 to conduct magnetic flux from the permanent magnet unit 41, through the magnetically permeable unit 102, to the magnetic induction unit 11 located adjacent thereto. In this way, the magnetic induction unit 11 may not be necessarily arranged adjacent to the permanent magnet unit 41, provided the magnetically permeable unit 102 is arranged to conduct such a magnetic path to allow the magnetic induction unit 11 to detect variation of the magnetic flux, making it possible for the processing unit 51 to carry out counting. This greatly improves flexibility of spatial arrangement and wire connection of the pedal body.

Figure 8:
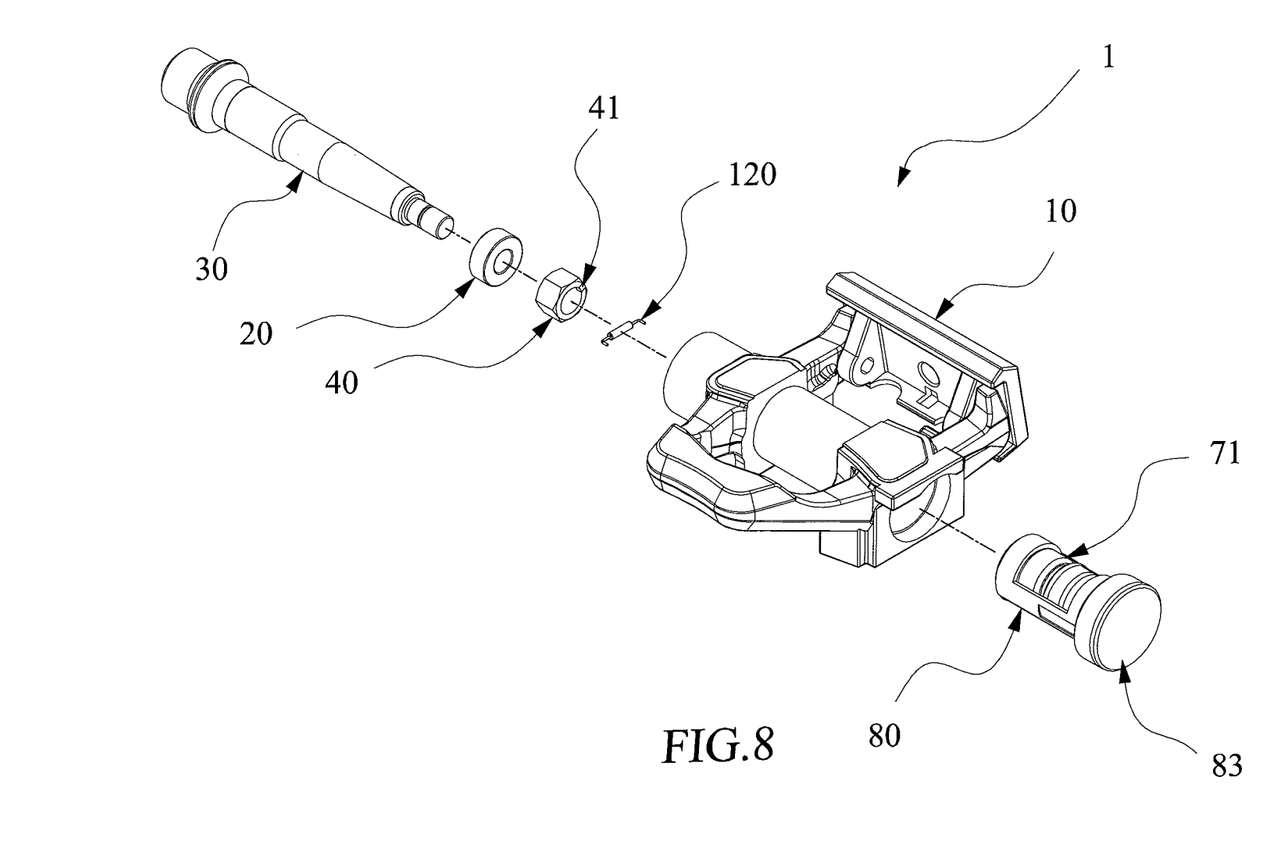
FIG. 8 is an exploded view showing an embedded magnetic induction pedal device according to a third embodiment of the present invention.

Referring to FIG. 8, a third embodiment of the present invention is provided and is different from the previous embodiments in that the eccentric seat 40 and the permanent magnet unit 41 are combined together as a unitary structure and the pedal body 10 is structured as a clip-in pedal specifically designed for use with a clip-in shoe.

Figure 9:
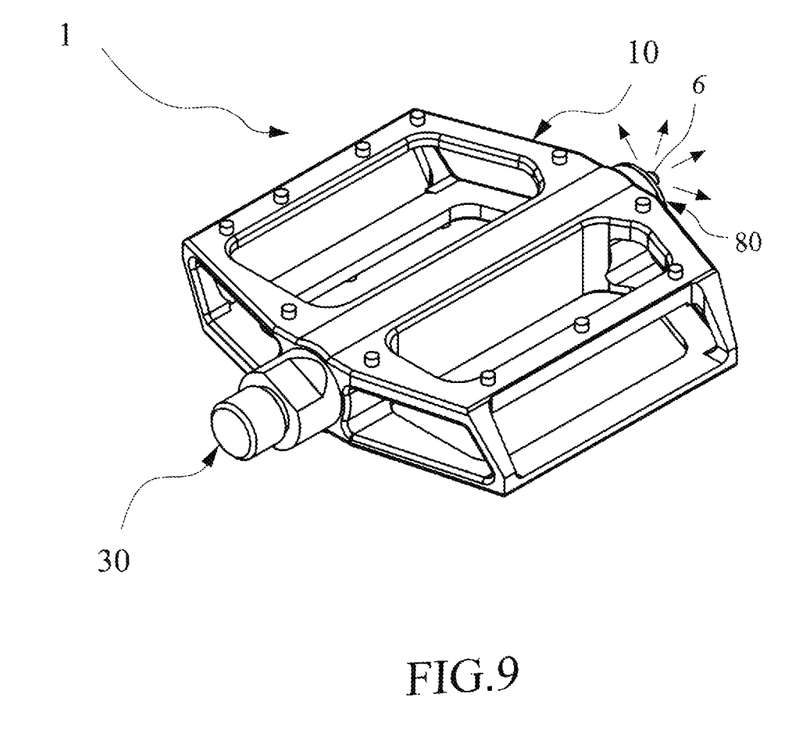
FIG. 9 is an exploded view showing an embedded magnetic induction pedal device according to a forth embodiment of the present invention

Referring to FIG. 9, a forth embodiment of the present invention is provided and is different from the first embodiment as shown in FIG. 1 in that at least one lighting indicator 6 is mounted on the fixing member 80. The lighting indicator 6 may include the power indicator 61, the normal indicator 62 and the matched indicator 63 shown in FIG. 3.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An embedded magnetic induction pedal device mounted to a pedal crank of a bicycle, the device comprising:
   a pedal body having a central portion and an axle hole is formed therein, the axle hole having an inside surface and at least one magnetic induction unit is mounted thereat;
   at least one bearing disposed within the inside surface of the axle hole;
   a pedal axle received in the axle hole, and the bearing coupling the pedal axle to the axle hole;
   an eccentric seat arranged at a free end of the pedal axle;
   at least one permanent magnet unit mounted in the eccentric seat to be located in deviated manner with respect to an axis of the pedal axle, the at least one magnetic induction unit thereby detects a variation of a magnetic field during relative motion between the at least one permanent magnet unit and the at least one magnetic induction unit;
   a processing unit connected to the at least one magnetic induction unit to calculate an operation data of the pedal crank according to the variation of the magnetic field detected by the at least one magnetic induction unit;
   a transmission device connected to the processing unit to transmit the operation data of the pedal crank; and
   a power supply unit for supplying an electrical power to the processing unit and the transmission device.

2. The embedded magnetic induction pedal device as claimed in claim 1, wherein the at least one magnetic induction unit includes either one of a reed switch or a Hall sensor element.

3. The embedded magnetic induction pedal device as claimed in claim 1, wherein the operation data of the pedal crank includes a rotational speed of the pedal crank, a number of turns of rotation of the pedal crank, or a combination thereof.

4. The embedded magnetic induction pedal device as claimed in claim 1, further comprising a fixing member arranged in the axle hole and spaced from the free end of the pedal axle by a distance, the fixing member receiving and holding therein the power supply unit.

5. The embedded magnetic induction pedal device as claimed in claim 4, further comprising at least one lighting indicator mounted to the fixing member and electrically connected to the processing unit.

6. The embedded magnetic induction pedal device as claimed in claim 5, wherein the at least one lighting indicator includes a power indicator for indicating a power energy of the power supply unit is in a normal condition, a normal indicator for indicating the processing unit is operating normally, and a matched indicator for indicating the processing unit having successfully established a link pairing for a wireless communication with an external terminal device.

7. The embedded magnetic induction pedal device as claimed in claim 4, further comprising a circuit board mounted to the fixing member, the circuit board receiving the processing unit and the transmission device for mounting thereon.

8. The embedded magnetic induction pedal device as claimed in claim 1, wherein the eccentric seat and the at least one permanent magnet unit are either one of separate from each other or combined with each other as a unitary structure.

9. The embedded magnetic induction pedal device as claimed in claim 1, further comprising at least one magnetically permeable unit arranged in the axle hole, the at least one magnetically permeable unit being positioned adjacent to both the at least one permanent magnet unit and the at least one magnetic induction unit.

10. The embedded magnetic induction pedal device as claimed in claim 1, wherein magnetism of the at least one permanent magnet unit is directly detectable by the at least one magnetic induction unit.

11. The embedded magnetic induction pedal device as claimed in claim 1, wherein the eccentric seat is fixed to the free end of the pedal axle.

12. The embedded magnetic induction pedal device as claimed in claim 1, wherein the transmission device communicates with a bicycle cycling computer or a personal smart electronic device through one of a wireless transmission and a wired transmission.

13. The embedded magnetic induction pedal device as claimed in claim 12, wherein the transmission device is in an operation mode of wireless transmission responsive to a first state, and the transmission device is in an operation mode of either one of wired transmission or wireless transmission responsive to a second state whereby the processing unit is deactivated for downloading of the operation data of the pedal crank to the bicycle cycling computer or the personal smart electronic device.

14. The embedded magnetic induction pedal device as claimed in claim 1, wherein the processing unit includes a data storage device for storing therein the operation data of the pedal crank, a bicycle identification, a bicycle condition, a maintenance data, and a data indicative of physiological condition of a user.

15. The embedded magnetic induction pedal device as claimed in claim 1, wherein the power supply unit includes either one of a non-rechargeable battery or a rechargeable battery to supply the electrical power.

* * * * *